US006941633B2

(12) United States Patent
Brooks et al.

(10) Patent No.: US 6,941,633 B2
(45) Date of Patent: Sep. 13, 2005

(54) TOOLING PROVISION FOR SPLIT CASES

(75) Inventors: Robert T. Brooks, Killingworth, CT (US); Matthew R. Rader, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/652,644

(22) Filed: Aug. 28, 2003

(65) Prior Publication Data

US 2005/0044685 A1 Mar. 3, 2005

(51) Int. Cl.[7] ......................... B23P 19/00; B23P 21/00; B23P 19/04

(52) U.S. Cl. ...................... 29/426.5; 29/426.1; 29/718; 29/239

(58) Field of Search ............................ 29/426.5, 426.1, 29/718, 757, 760, 238, 239, 283

(56) References Cited

U.S. PATENT DOCUMENTS

| | | | | |
|---|---|---|---|---|
| 4,905,588 A * | 3/1990 | Hara | .......................... | 100/232 |
| 6,352,404 B1 | 3/2002 | Czachor et al. | | |

FOREIGN PATENT DOCUMENTS

| | | |
|---|---|---|
| CA | 1046250 | 1/1979 |
| DE | 28 22 972 A1 | 1/1979 |
| DE | 197 03 810 A1 | 7/1998 |
| DE | 299 10 551 U1 | 12/1999 |

* cited by examiner

*Primary Examiner*—John C. Hong
(74) *Attorney, Agent, or Firm*—Bachman & LaPointe, P.C.

(57) ABSTRACT

An apparatus for separating two flanges, comprising a first prying grip having at least one flange contact member, a second prying grip having at least one flange contact member; and means for separating the flange contact members.

27 Claims, 3 Drawing Sheets

TOOLING PROVISION FOR SPLIT CASES

U.S. GOVERNMENT RIGHTS

The Government may have rights in this invention, pursuant to Contract No. N00019-02-C-3003, awarded by the United States Navy.

BACKGROUND OF THE INVENTION (1) Field of the Invention

The present invention relates to an apparatus, and method for so using, for separating and disassembling split cases along split flanges.

(2) Description of the Related Art

It is often times necessary to disassemble split cases in order to gain access to the internal parts of an engine compressor. Typical approaches of disassembling split cases involves fabricating jack screws or special threaded pick-up points onto each of the split cases as illustrated in FIG. 1. As can be seen, jack screw tabs 13, 13' are fabricated so as to extend from split flanges 11, 11'. Split flanges 11, 11' extend radially outwards from split cases 15, 15'. Unfortunately, the requirement of fabricating jack screw tabs 13 extending from a split flange 11 often times determines the local raw material envelope of the machined split case 15 thus driving up not only the cost of raw material (because of additional forging and casting features), but also the amount of material that must be removed during subsequent machining processes. In addition, the existence of jack screw tabs 13 increase the amount of material, and thus weight, required to be carried during flight. What is therefore needed is a method and apparatus for disassembling split cases which have a minimal weight impact and is cost effective.

SUMMARY OF THE INVENTION

Accordingly, it is an object of the present invention to provide an apparatus, and method for so using, for separating and disassembling split cases.

It is a further object of the present invention to provide an apparatus for separating two flanges, which comprises a first prying grip having at least one flange contact member, a second prying grip having at least one flange contact member; and means for separating the flange contact members.

It is a further object of the present invention to provide a method for separating two flanges which comprises the steps of providing at least one pair of prying grips comprising a first prying grip having at least one flange contact member and a second prying grip having at least one flange contact member, providing each of the prying grips with a means for separating the flange contact members, providing at least one recess in at least one flange, inserting the flange contact members into the at least one recess, and operating the means for separating the flange contact members so as to separate said two flanges.

It is a further object of the present invention to provide an apparatus for separating two split flanges, comprising a first prying grip having at least one flange contact member, a second prying grip having at least one flange contact member, means for separating the flange contact members, and at least one recess residing in one of the two flanges adapted to accept the flange contact members.

It is a further object of the present invention to provide a system for disassembling a jet engine split casing which comprises a first prying grip having at least one flange contact member, a second prying grip having at least one flange contact member, and means for separating the flange contact members, and a jet engine split casing comprising two split cases each comprising at least one flange.

It is a further object of the present invention to provide a method for separating two split cases of a gas turbine engine which comprises the steps of providing a prying grip assembly comprising at least one pair of prying grips comprising a first prying grip having at least one flange contact member and a second prying grip having at least one flange contact member, and providing a means for separating the flange contact members, providing at least one recess in at least one flange of a split case of a gas turbine engine, inserting the flange contact members into the at least one recess, and operating the means for separating the flange contact members so as to separate the two flanges.

DETAILED DESCRIPTION

It is therefore a central object of the present invention to provide an apparatus for disassembling split cases for gas turbine or jet engines and a method for using such apparatus. In its preferred embodiment, as will be described more fully below, the present invention makes use of two prying grips. Each prying grip contains a flange contact member created so as to fit within a recess or recesses fabricated into at least one split flange of at least one split case to be separated from another split case. Each prying grip additionally includes a means for separating one prying grip from the other prying grip. In a preferred embodiment, a means for separating comprises a threaded hole fabricated into each prying grip through which a threaded member may be screwed or otherwise inserted. By so doing, the two threaded members push against one another, thereby separating the split cases.

Figure 2:
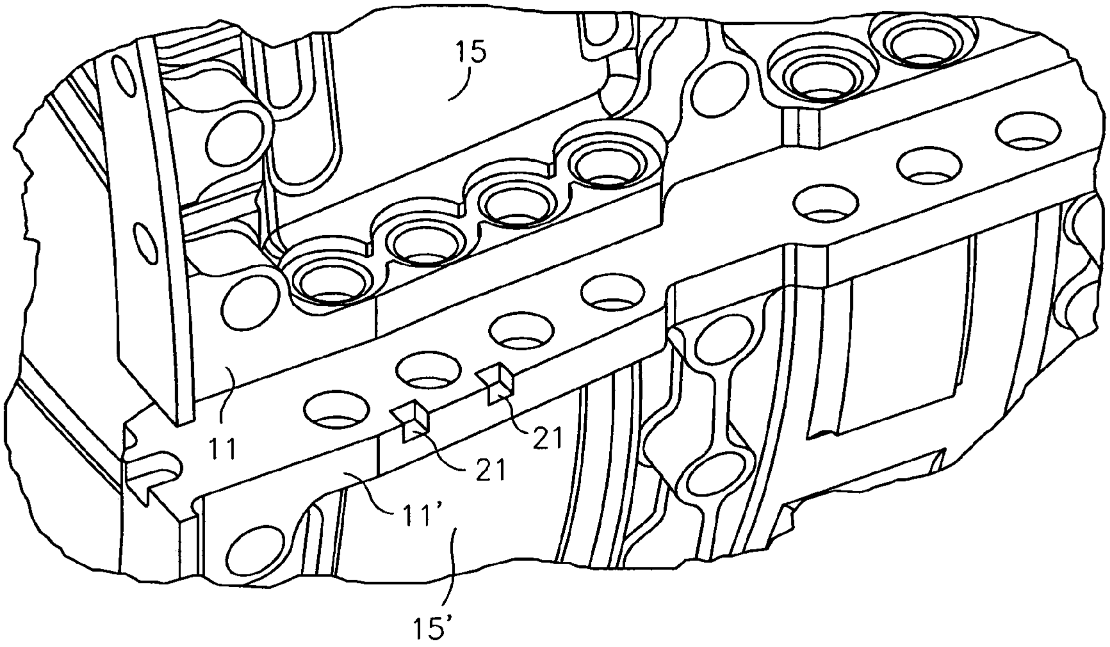
FIG. 2 is a perspective illustration of a preferred embodiment of the flange recess of the present invention.

With reference to FIG. 2, there is illustrated in detail the configuration of the flange recesses 21 fabricated into one split flange 11. At least one flange recess 21 is machined or otherwise fabricated into a split flange 11 extending from one half of the split case 15. Preferably, two recesses 21 per pair of prying grips 31, 33 are fabricated as described above. Depending upon the amount of disassembly force required, additional recesses may be added and utilized by one or more prying grips as will be described more fully below. In order to disassemble the split case 15, split flange bolts and circumferential flange bolts (not pictured) are removed from the split cases 15, 15'. Next, the prying grips 31, 33 are fitted into the flange recesses 21 in the split flange 11.

Figure 3:
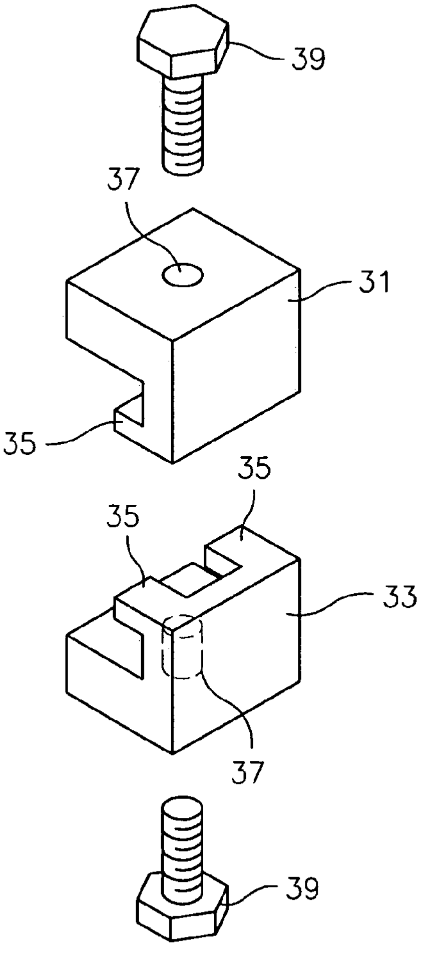
FIG. 3 is a perspective illustration of the prying grips and separation means of the present invention.
Figure 4:
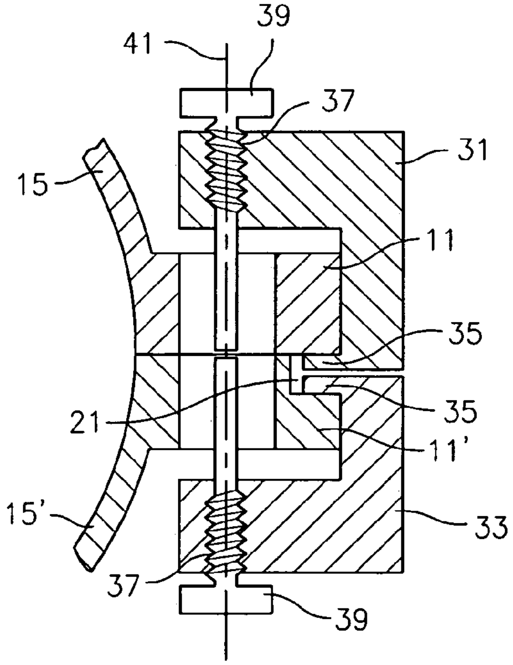
FIG. 4 is a cross section of the prying grips, separation means, and split cases of the present invention.

With reference to FIG. 3, there is shown in more detail the construction of the prying grips 31, 33. First prying grip 31 is constructed with one or more flange contact members 35 as well as a separating means. In the preferred embodiment illustrated, the separating means is provided in the form of a threaded hole 37 and a threaded member 39. Preferably, threaded member 39 is a threaded bolt. However, threaded member 39 may be of any construction such that turning threaded member 39 causes threaded member 39 to move through threaded hole 37. Similarly, second prying grip 33 is comprised of one or more flange contact members 35 as well as a threaded hole 37 and a threaded member 39. With reference to FIG. 4, there is illustrated the manner by which the first and second prying grips 31, 33 are configured to separate split cases 15, 15'. First prying grip 31 is placed such that its flange contact member 35 is inserted into a fabricated flange recess 21. Similarly, second prying grip 33 is situated such that its flange contact member 35 is also inserted into the fabricated flange recess 21. The threaded hole 37 of both first prying grip 31 and second prying grip 33 are generally aligned along axis 41. In this configuration, it is therefore possible to insert a threaded member 39 into both the threaded hole 37 of first prying grip 31 and second prying grip 33. Threaded members 39 are threaded into their respective threaded holes 37 a distance sufficient such that each threaded member 39 comes in contact with the other threaded member 39. In a preferred embodiment, each split case 15 has, on each opposing side, a split flange 11. Split flange recesses 21 are preferably fabricated near the front and back of each split flange 11, 11' on each side for a total of at least four flange recesses so that a total of four pairs of prying grips 31, 33 can be attached to the assembled split case 15. Once all four pairs of prying grips are attached as described above and the threaded members 39 are threaded into contact with their opposing threaded members 39, the threaded members are further threaded in an alternating pattern between the sides and the front and back of the split case 15. In this manner, the split case halves 15 will begin to separate.

Figure 5:
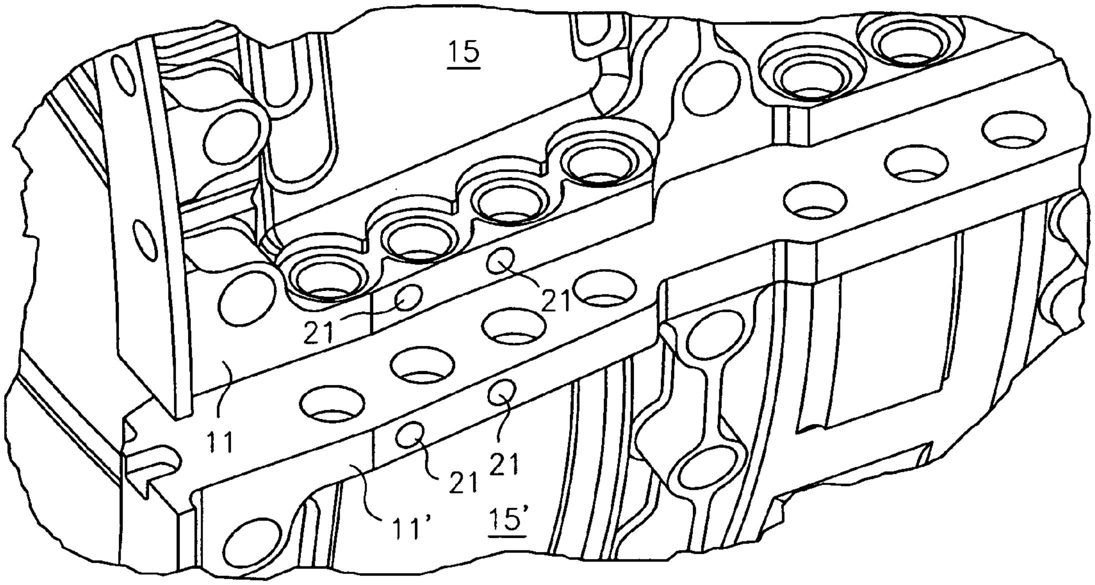
FIG. 5 is a perspective illustration of an alternative embodiment of the flange recess of the present invention.
Figure 6:
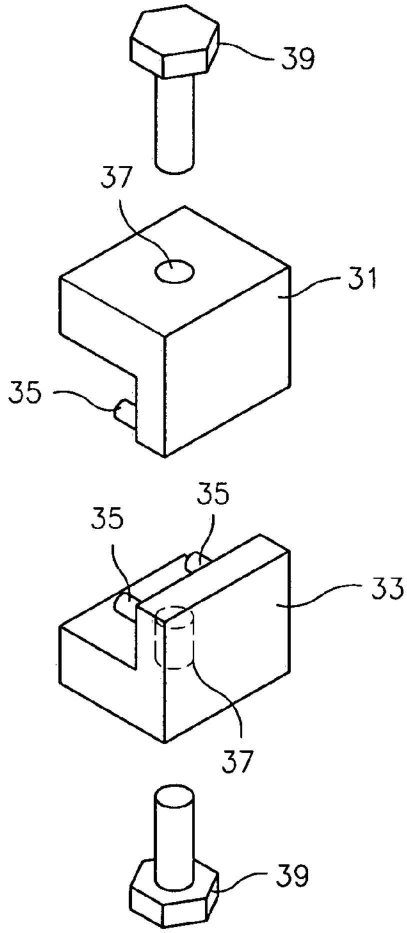
FIG. 6 is a perspective illustration of an alternative embodiment of the prying grips and separation means of the present invention.
Figure 7:
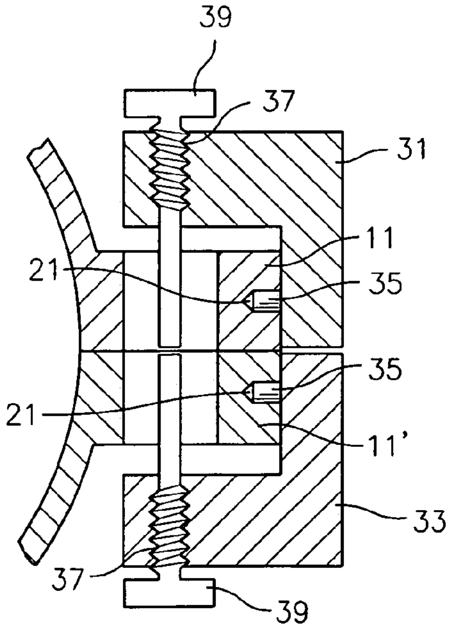
FIG. 7 is a cross section of the prying grips, separation means, and split cases of an alternative embodiment of the present invention.

With reference to FIG. 5, there is illustrated an alternative embodiment of the present invention. Note that the recesses 21 are fabricated into each opposing split flange 11 as opposed to the recesses fabricated in only one of the split flanges 11 as illustrated in FIG. 2. In addition, note that the flange contact members 35 of first prying grip 31 and second prying grip 33 are formed as generally cylindrical protrusions. These generally cylindrical protrusions forming the flange contact members 35 are fabricated so as to fit inside cylindrical flange recesses 21. With reference to FIG. 7, there is shown in detail and in profile the manner in which the flange contact members 35 located on first prying grip 31 and second prying grip 33 are inserted into the recesses 21 fabricated into each of two split flanges 11, 11'. The primary advantage of using cylindrical recesses 21 is that such recesses provide protection against an operator using a flat head screwdriver or other potentially damaging tool to attempt to pry the case apart instead of using the prying grips 31, 33 of the present invention. In addition, machining is slightly easier if the recesses 21 are cylindrical since only a plunge cut is required to be made as opposed to using a small cutter in traversing to make a rectangular recess as illustrated in FIG. 2.

Figure 1:
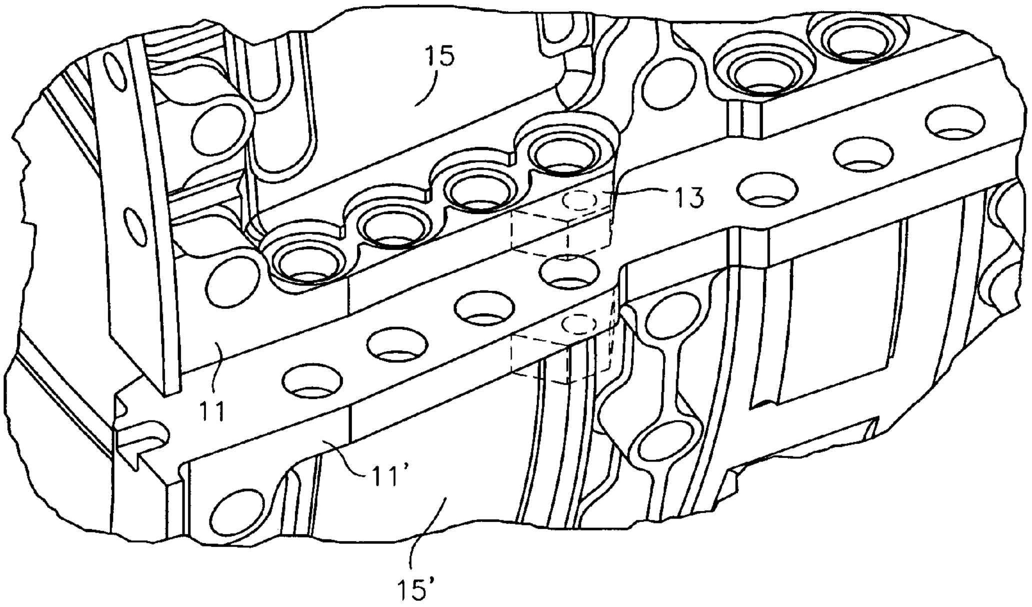
FIG. 1 (PRIOR ART)
FIG. 1 is a perspective illustration of the split flanges known in the art.
Figure 8:
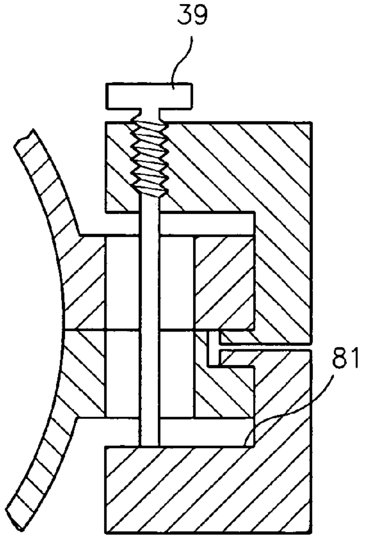
FIG. 8 is a cross section of an alternative embodiment of the present invention.

In an alternative embodiment of the present invention, one of a pair of prying grips 31, 33 is not provided with a threaded hole, but rather provides a generally flat surface 81 against which the threaded member of the other prying grip. Such an embodiment is illustrated with reference to FIG. 8.

In a preferred embodiment, the prying grips 31, 33 are fabricated of a medium strength steel or other iron alloy. Still offers a good trade between strength and cost. An important parameter of the material chosen is the hardness of the material, which should ideally be lower than the hardness value of the split case and flange on which it is being used. Such a configuration prevents scoring of the case surfaces because of the tooling.

It is apparent that there has been provided in accordance with the present invention an apparatus, and method for so using, for separating and disassembling split cases which filly satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as falling within the broad scope of the appended claims.

What is claimed is:

1. An apparatus for separating two flanges, comprising:
- a first prying grip having at least one flange contact member;
- a second prying grip having at least one flange contact member;
- means for separating said flange contact members; and
- said flange contact members simultaneously occupying at least one recess in a flange.

2. The apparatus of claim 1, wherein said means for separating comprises a threaded hole extending through said first prying grip for accepting a first threaded member.

3. The apparatus of claim 2, wherein said means for separating additionally comprises a threaded hole extending through said second prying grip for accepting a second threaded member.

4. The apparatus of claim 3, wherein each said threaded member is a threaded bolt.

5. The apparatus of claim 3, wherein the threaded hole of said first prying grip is in alignment with the threaded hole of said second prying grip when one flange contact member of said first prying grip and one flange contact member of said second prying grip is inserted into a flange recess.

6. The apparatus of claim 1, wherein said first and second prying grips are fabricated from a metal selected from the group consisting of steel and other iron alloys.

7. The apparatus of claim 1, wherein said first and second prying grips are fabricated from a material having a lower hardness value than a material from which said flanges are composed.

8. An apparatus for separating two flanges, comprising:
- a first prying grip having at least one flange contact member;
- a second prying grip having at least one flange contact member;
- means for separating said flange contact members; and
- one of said at least one flange contact member of said first prying grip being inserted into a first flange recess and one of said at least one flange contact member of said second prying grip being inserted into a second flange recess.

9. The apparatus of claim 8 wherein said first flange recess and said second flange recess are each generally cylindrical.

10. A method for separating two flanges comprising the steps of:
- providing a prying grip assembly comprising at least one pair of prying grips comprising a first prying grip having at least one flange contact member and a second prying grip having at least one flange contact member, and providing a means for separating said flange contact members;

providing at least one recess in at least one flange;

inserting said flange contact members into said at least one recess; and operating said means for separating said flange contact members so as to separate said two flanges.

11. The method of claim 10 wherein providing said means for separating comprises the steps of:

providing a threaded hole and a threaded member in each of said pair of prying grips; and inserting the threaded member of said first prying grip into the threaded hole of said first prying grip and inserting the threaded member of said second prying grip into the threaded hole of said second prying grip such that both threaded members are aligned along an axis and are in contact the one with the other.

12. The method of claim 10 wherein the step of operating said means for separating said flange contact members comprises the steps of:

threading said threaded member of said first prying grip so as to push against the threaded member of said second prying grip.

13. An apparatus for separating two split flanges, comprising:

a first prying grip having at least one flange contact member;

a second prying grip having at least one flange contact member;

means for separating said flange contact members;

at least one recess residing in one of said two flanges; and said flange contact members being inserted into said at least one recess.

14. An apparatus for separating two split flanges, comprising:

a first prying grip having at least one flange contact member;

a second prying grip having at least one flange contact member;

means for separating said flange contact members;

at least one recess residing in one of said two flanges adapted to accept said flange contact members; and said means for separating comprising a threaded hole extending through said first prying grip adapted to accept a threaded member.

15. The apparatus of claim 14, wherein said means for separating additionally comprises a threaded hole extending through said second prying grip adapted to accept a threaded member.

16. The apparatus of claim 14, wherein said threaded member is a threaded bolt.

17. System for disassembling a jet engine split casing, comprising:

a first prying grip having at least one flange contact member;

a second prying grip having at least one flange contact member; and means for separating said flange contact members; and a jet engine split casing comprising two split cases each comprising at least one flange.

18. The system of claim 17, wherein said flange contact members simultaneously occupy at least one recess in a flange.

19. The system of claim 17, wherein said means for separating comprises a threaded hole extending through said first prying grip for accepting a first threaded member.

20. The system of claim 19, wherein said means for separating additionally comprises a threaded hole extending through said second prying grip for accepting a second threaded member.

21. The system of claim 20, wherein each said threaded member is a threaded bolt.

22. The system of claim 20, wherein the threaded hole of said first prying grip is in alignment with the threaded hole of said second prying grip when one flange contact member of said first prying grip and one flange contact member of said second prying grip is inserted into a flange recess.

23. The system of claim 17, wherein one of said at least one flange contact member of said first prying grip is inserted into a first flange recess and one of said at least one flange contact member of said second prying grip is inserted into a second flange recess.

24. The system of claim 23 wherein said first flange recess and said second flange recess are each circular.

25. Method for separating two split cases of a gas turbine engine comprising the steps of:

providing a prying grip assembly comprising at least one pair of prying grips comprising a first prying grip having at least one flange contact member and a second prying grip having at least one flange contact member, and providing a means for separating said flange contact members;

providing at least one recess in at least one flange of a split case of a gas turbine engine;

inserting said flange contact members into said at least one recess; and operating said means for separating said flange contact members so as to separate said two flanges.

26. The method of claim 25 wherein providing said means for separating comprises the steps of:

providing a threaded hole and a threaded member in each of said pair of prying grips;

inserting the threaded member of said first prying grip into the threaded hole of said first prying grip and inserting the threaded member of said second prying grip into the threaded hole of said second prying grip such that both threaded members are aligned along an axis and are in contact the one with the other.

27. The method of claim 26 wherein the step of operating said means for separating said flange contact members comprises the steps of:

threading said threaded member of said first prying grip so as to push against the threaded member of said second prying grip.

* * * * *